May 23, 1967    M. D. JENNINGS ET AL    3,320,909
PLANTER
Original Filed Sept. 26, 1962                    2 Sheets-Sheet 1
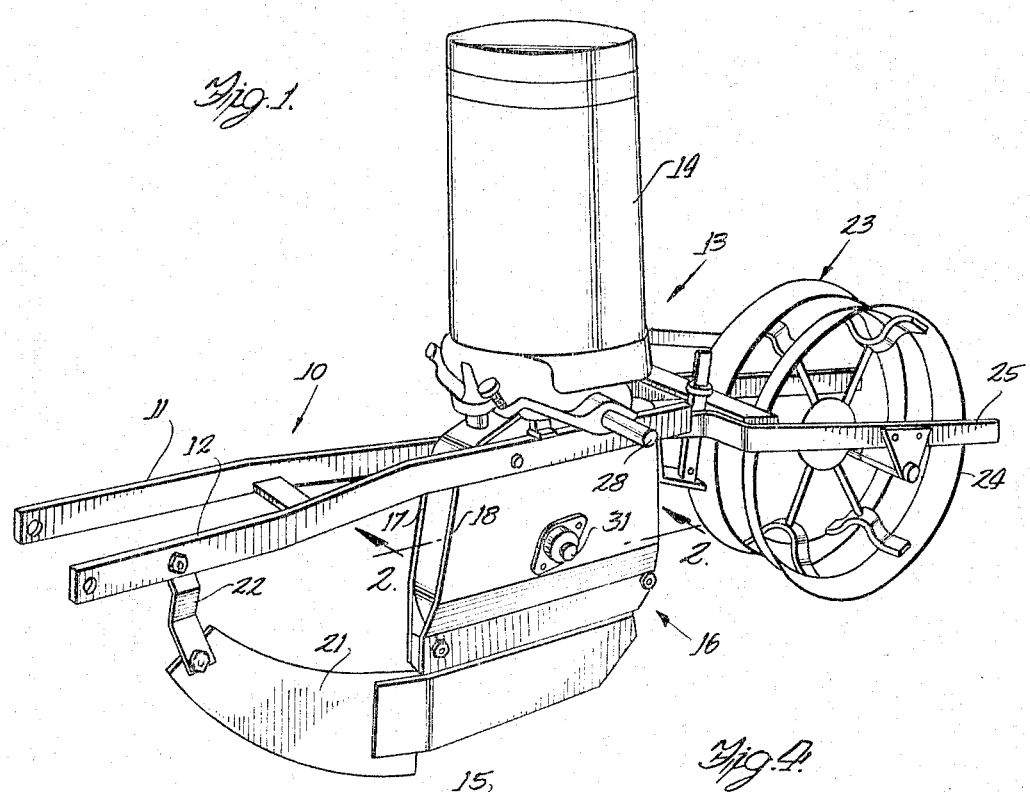
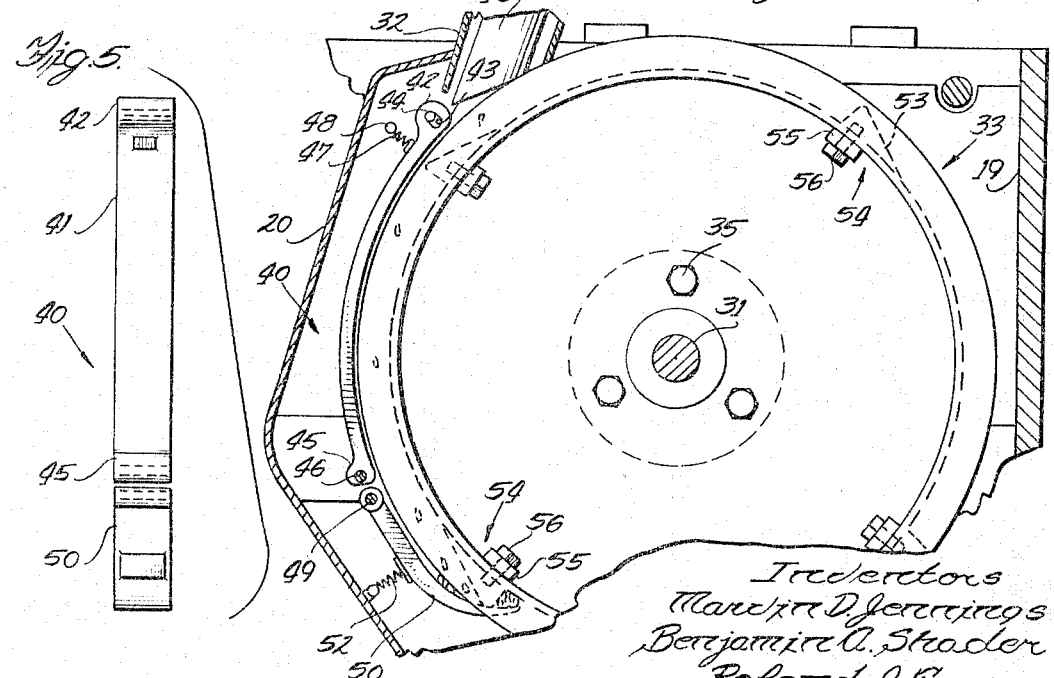
Inventors
Marvin D. Jennings
Benjamin A. Shader
Roland J. Frase
Attorney

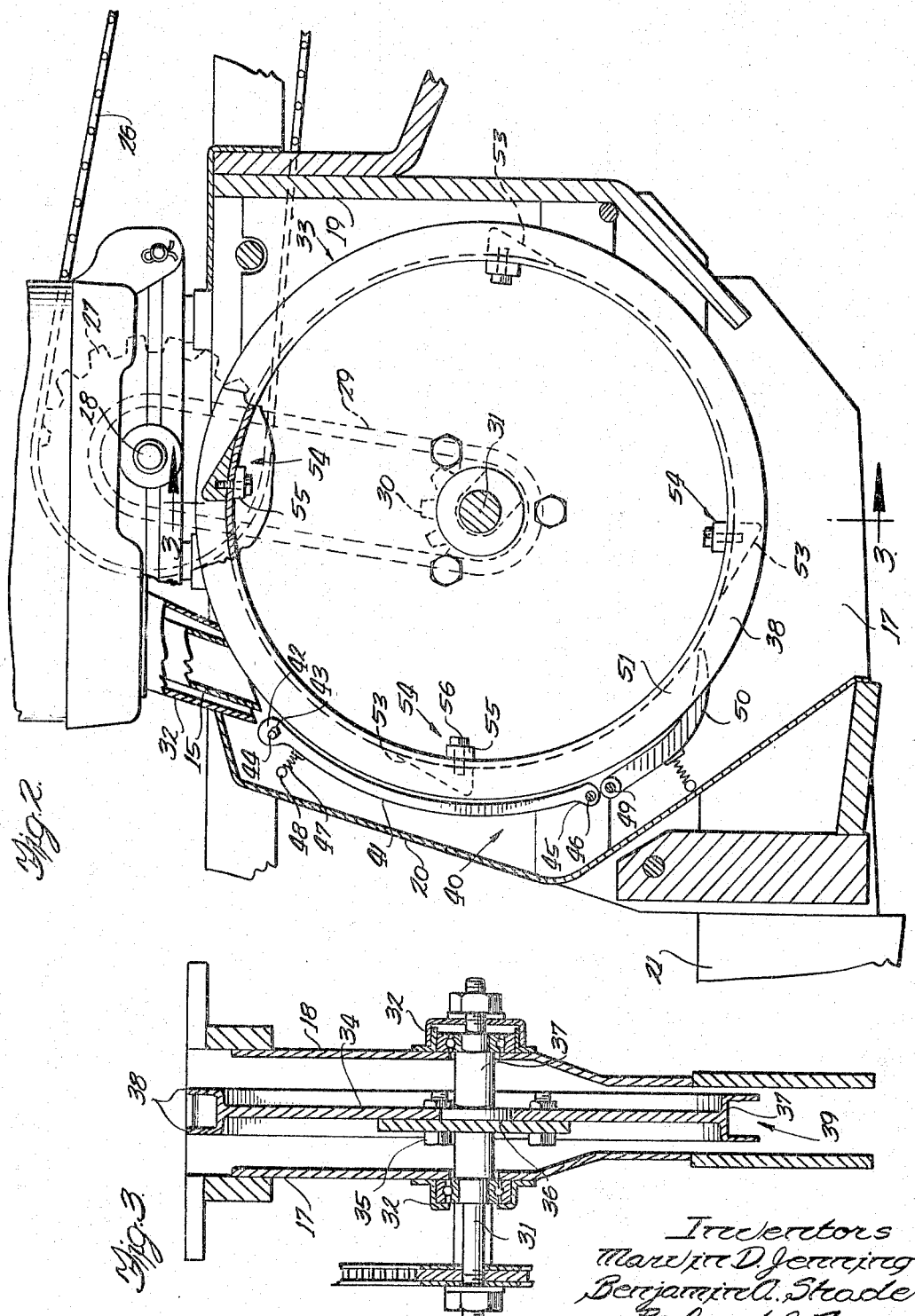

United States Patent Office 3,320,909
Patented May 23, 1967

3,320,909
PLANTER
Marvin D. Jennings, Naperville, Benjamin A. Shader, Hinsdale, and Roland J. Frase, Palatine, Ill., assignors to International Harvester Company, a corporation of Delaware
Continuation of application Ser. No. 226,397, Sept. 26, 1962. This application Nov. 9, 1964, Ser. No. 411,180
6 Claims. (Cl. 111—51)

This application is a continuation of U.S. application Ser. No. 226,397, filed Sept. 26, 1962, now abandoned. This invention relates to agricultural implements and particularly to planters. More specifically the invention concerns a planter of the hilldrop type.

One of the objectives in planting seed, especially in hills is to deposit the seed in the furrow with a minimum of disturbance. In conventional planters, seed groups are discharged with such force and in such a direction to the furrow that the seed bounces and is not uniformly grouped for optimum growing conditions. Therefore, an object of this invention is the provision of a novel planter mechanism for depositing seed in the ground with maximum efficiency and a minimum of variation in the desired seed pattern.

Another object of the invention is the provision of a novel seed planter mechanism for depositing seed accurately and uniformly in the ground at selected spacings, and wherein means are provided for quickly and easily adjusting the row spacing without impairing the accuracy and uniformity of planting.

Another object of the invention is the provision of simple and efficient hilldrop mechanism for a planter whereby the number of seed deposited in a hill and the spacing in the row can be quickly and easily adjusted.

Other objects and advantages of the invention will become clear from the following detailed description when read in conjunction with the accompanying drawings, wherein:

FIGURE 1 is a perspective view of a planter unit incorporating the features of this invention;
FIGURE 2 is an enlarged section taken on the line 2—2 of FIGURE 1;
FIGURE 3 is a section taken on the line 3—3 of FIGURE 2;
FIGURE 4 is an end elevation of the closure member of FIGURES 2 and 4; and
FIGURE 5 is an end elevation of the closure member for the seed conduit.

The ground wheel drive planter unit shown in FIGURE 1 includes a supporting frame designated at 10 and comprising spaced bars 11 and 12 adapted for connection to a tractor or the like. Frame 10 provides support for seed dispensing mechanism 13 including a hopper 14 from which seed is dispensed at regular intervals by conventional seed plate mechanism, not shown. Seed from hopper 14 is discharged through a tube 15 opening into a seed boot 16 comprising laterally spaced plates 17 and 18 closed at the rear by a wall 19 and at the front by another wall 20. To the lower end of boot 16 is secured a furrow opener in the form of a runner 21, the forward end of which curves upwardly and is connected by a strap 22 to bar 12 of the frame 10.

Drive for operating the dispensing mechanism of the planter is taken from a ground-engaging press wheel 23 rotatably mounted on a shaft 24 carried by a yoke 25 mounted on the rear of frame 10, the wheel 23 being connected by an endless chain 26 to a sprocket wheel 27 mounted on a shaft 28 for driving the seed plate mechanism.

An endless chain 29 drivingly connects shaft 28 with another sprocket wheel 30 secured to a shaft 31, mounted in bearings 32 carried by plates 17 and 18.

Seed tube 15 is disposed within a stub outlet 32 and discharges seed into the space between the plates 17 and 18 from which it is conducted into the furrow formed by the furrow opening tool 21.

A seed ejecting rotor or wheel 33 is mounted on shaft 31 to be driven thereby. Wheel 33 comprises an annular portion 34 affixed by bolts 35 to a plate 36 secured to a bushing 37 mounted on shaft 31. Annular portion 34 of the wheel is disk-like and is flared outwardly at its periphery to form a broadened rim 37 having a flattened periphery and radially outwardly projecting flanges 38 forming a channel 39, U-shaped in cross-section as shown in FIGURE 3.

As shown in FIGURE 2, a portion of the wheel 33 with its U-shaped channel 39 is disposed below and in the path of seed falling from the tube 15. A closure for the channel 39 to form a substantially closed conduit for guiding the seed in an arcuate path from tube 15 to the ground is provided by a member 40 arcuately shaped to conform to the curvature of wheel 33 and including a member 41 disposed between the plates 17 and 18 closely adjacent the outer periphery of flanges 38 of the wheel. The upper end of the arcuately shaped member 41 is enlarged to form a boss 42, having a slotted opening 43 therein to receive a pin 44 carried between the plates 17 and 18. The lower end of closure member 41 is enlarged to form a boss 45 having an opening therein to receive a pivot pin 46. Member 41 is biased radially inwardly toward the wheel by the provision of a spring 47 anchored to a pin 48 carried by plate 17.

Pivot pin 46 and another pivot pin 49 are carried by plates 17 and 18, and upon pin 49 is mounted a generally cup-shaped member 50, the lower end of which is curved inwardly and terminates adjacent the periphery 37 of the wheel 33 to form therewith a pocket designated at 51 for the accumulation of seed falling through the guide channel or conduit formed by the wheel and member 40, pocket-forming member 50 being yieldably urged into engagement with the periphery of the wheel or rotor 33 by a spring 52 anchored to the lower portion of the forward wall 20 of the boot.

Seed is ejected from the seed pocket 51 by the provision of triangularly shaped projections or lugs 53 removably secured at circumferentially spaced locations to the periphery 37 of the wheel. Attaching means 54 are provided on the inner portion of the rim 37 and includes an attaching block 55 threaded to receive a screw 56 seated in an opening in the lug 53.

As shown particularly well in FIGURE 2, the lugs 53 are easily removable from the wheel to selectively vary the circumferential spacing between adjacent lugs. During rotation of the wheel 33 seed falling at regular intervals into the channel 39 from tube 15 accumulates in pocket 51 and is engaged by the lug 53, moving the cup-shaped member 50 radially outwardly about pivot 49 and against the action of spring 52 to eject the seed into the furrow formed by the runner 21.

The wheel 33 is driven substantially at ground speed by the press wheel 23 and the diameter of the wheel 33 is so chosen that the seed in pocket 51 drops into the furrow at ground speed and remains where it falls in a cluster without bouncing and consequent disturbance of the position of the seed in the furrow. The number of seed in the hill is determined by the number of lugs 53 mounted on the wheel. The wheel is approximately 38 inches in circumference so that the spacing in the row between adjacent hills of seed is determined by the spacing between adjacent lugs 53 on the wheel. The four lugs shown on the wheel in the drawings deposit the seed in hills approximately 10 inches apart. By removing two opposite lugs from the wheel, the spacing between adjacent hills will be approximately 20 inches. The fewer lugs on the wheel 33, the greater the number of seed accumulated in pocket 51 before it is engaged by a lug. For example, with three of the lugs removed and only one lug remaining, the seed will be ejected only once for each revolution of the wheel.

Seed accidentally wedged between the lug 53 and closure member 41 will not be crushed because the closure member yields against the action of the spring 47 within the limits of pin 44 in slot 43. Flanges 38 of the wheel closely flank the lugs 53 so that seed cannot wedge therebetween and the tip of each lug 53 moves closely adjacent the inner face of closure member 40.

The moving channel 39 of the wheel forms with the stationary closure member 40 a conduit which, in turn, forms with the member 50 a valve structure which opens and closes with the rotation of the wheel to discharge clusters of seed at regular intervals from the pocket 51 in which it is accumulated.

It is believed that the construction and operation of the novel planting apparatus of this invention will be clearly understood from the foregoing description. It should likewise be understood that the invention has been described in its preferred embodiment only, and that modications may be made therein without departing from the spirit of the invention or the scope of the appended claims.

What is claimed is:

1. In a planter having a mobile frame, a seed container and a furrow opener mounted on the frame and a boot structure mounted on the frame between the furrow opener and the container including spaced plates between which seed from the container passes from the container to the furrow opener, a wheel rotatably mounted between said plates, a plurality of circumferentially spaced lugs affixed to the periphery of the wheel and projecting radially outwardly therefrom in the path of seed falling from the container, radially projecting annular peripheral flange members flanking said lugs and forming with the periphery of the wheel a U-shaped channel for the seed, and a member yieldably mounted between said plates and extending toward the periphery of said wheel radially inwardly of said lugs and forming with the wheel a pocket for the accumulation of seed discharged from said container, said pocket forming member being in the path of and engageable by said lugs and yieldable radially outwardly upon engagement therewith to eject the accumulated seed from said pocket.

2. The invention set forth in claim 1, wherein an arcuately shaped closure member is mounted between said plates above and in generally circumferential alignment with said pocket forming member adjacent the outer peripheral edges of said wheel flanges to form therewith and the periphery of the wheel a substantially closed conduit for the passage of seed from the container to the ground.

3. In a hilldrop planter having a mobile frame, a seed dispenser mounted on the frame, a seed boot mounted on the frame in association with the dispenser to receive seed therefrom, and means in the boot for guiding the seed in a fixed path to the ground including a wheel, means carried by the frame for rotating said wheel, attaching means carried by the wheel in the periphery thereof at circumferentially spaced locations thereabout, a radially projecting lug secured to at least one of said attaching means, and retainer means yieldably mounted in the boot projecting toward and operatively engageable with the periphery of the wheel radially inwardly of said lug for a substantial portion of the cycle of rotation of said wheel to accumulate seed therein during rotation of said wheel and prior to engagement of said retainer means by said lug, said lug being engageable with said retainer to move it radially outwardly and eject the seed therefrom, and the periphery of the wheel being provided with annular radially projecting flanges spaced the width of the periphery of the wheel and forming therewith a channel enclosing the lugs on three sides.

4. The invention set forth in claim 3, wherein an arcuately shaped guide member is mounted in said boot adjacent the periphery of said flanges to form a closure for a portion thereof and provide a conduit for the passage of seed from the container to the ground.

5. The invention set forth in claim 4, wherein said retainer means is a member pivotally mounted in the boot and having a curved lower end projecting radially inwardly between said flanges substantially into engagement with the periphery of the wheel to arrest the passage of seed through said conduit.

6. The invention set forth in claim 5, wherein spring means mounted in the boot biases said retainer means radially inwardly and is yieldable upon engagement of said lug with the retainer means to accommodate ejection of the seed.

References Cited by the Examiner

UNITED STATES PATENTS

| | | |
|---|---|---|
| 544,966 | 8/1895 | Davis. |
| 803,082 | 10/1905 | Waterman. |
| 1,285,610 | 11/1918 | Burnett. |
| 1,751,486 | 3/1930 | Lutz _____ 111—51 X |
| 3,176,636 | 4/1965 | Wilcox et al. _____ 111—51 |

ABRAHAM G. STONE, *Acting Primary Examiner.*

WILLIAM A. SMITH III, *Examiner.*